May 28, 1968      T. S. REED      3,385,128
ADJUSTABLE STEERING MECHANISM
Filed Nov. 26, 1965      3 Sheets-Sheet 1
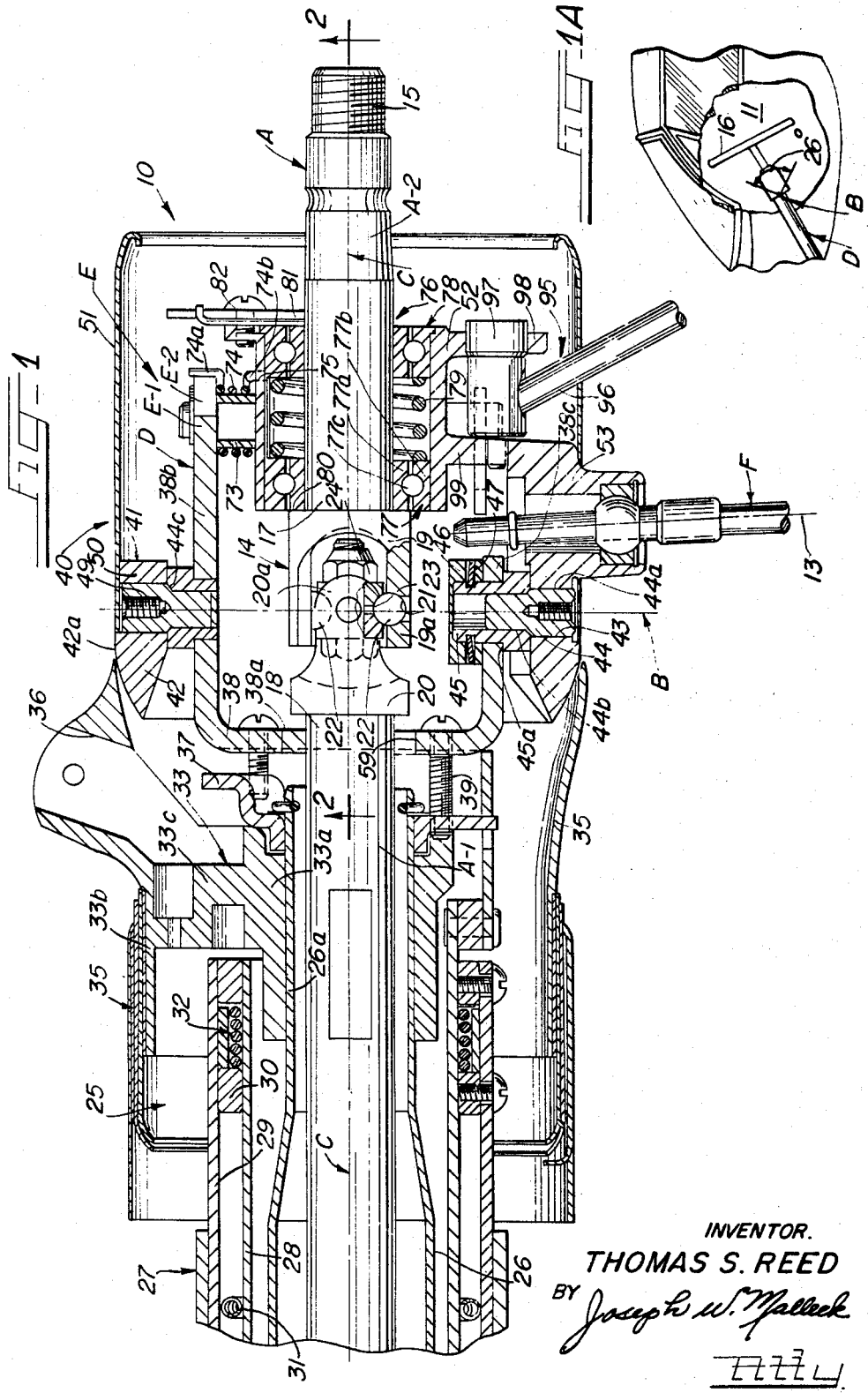
INVENTOR.
THOMAS S. REED
BY Joseph W. Malleck
ATTY May 28, 1968  T. S. REED  3,385,128
ADJUSTABLE STEERING MECHANISM
Filed Nov. 26, 1965  3 Sheets-Sheet 2
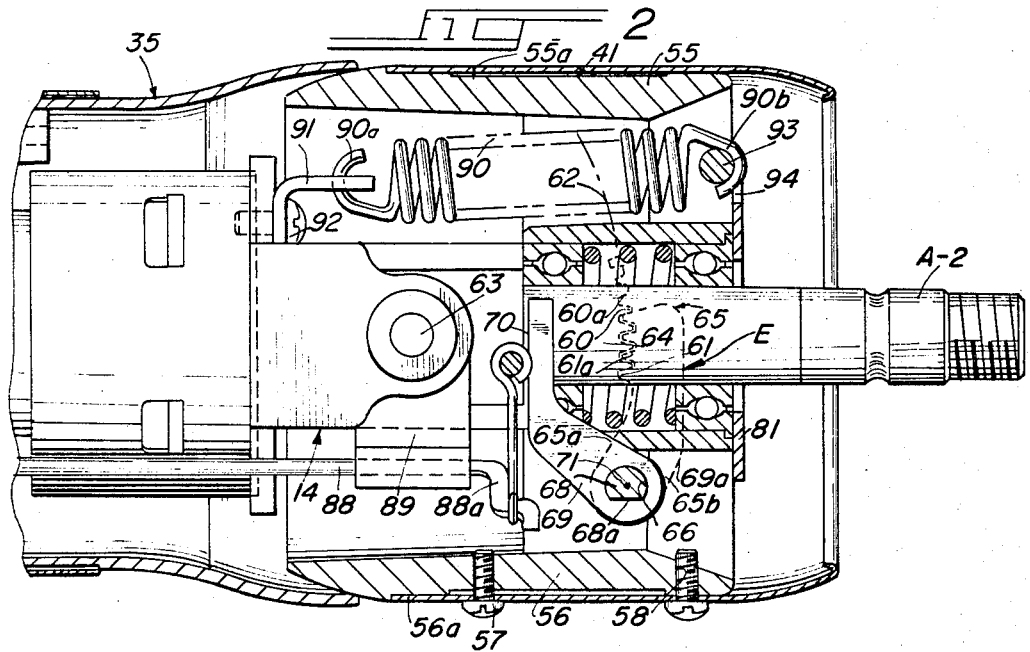
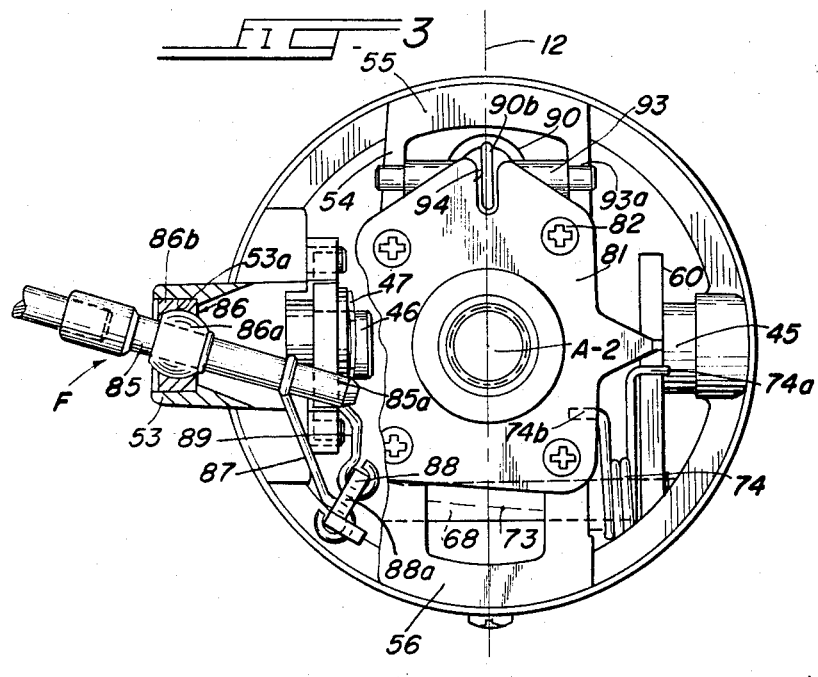
INVENTOR.
THOMAS S. REED
BY Joseph W. Mallack
ATTY May 28, 1968 T. S. REED 3,385,128
ADJUSTABLE STEERING MECHANISM
Filed Nov. 26, 1965 3 Sheets-Sheet 3
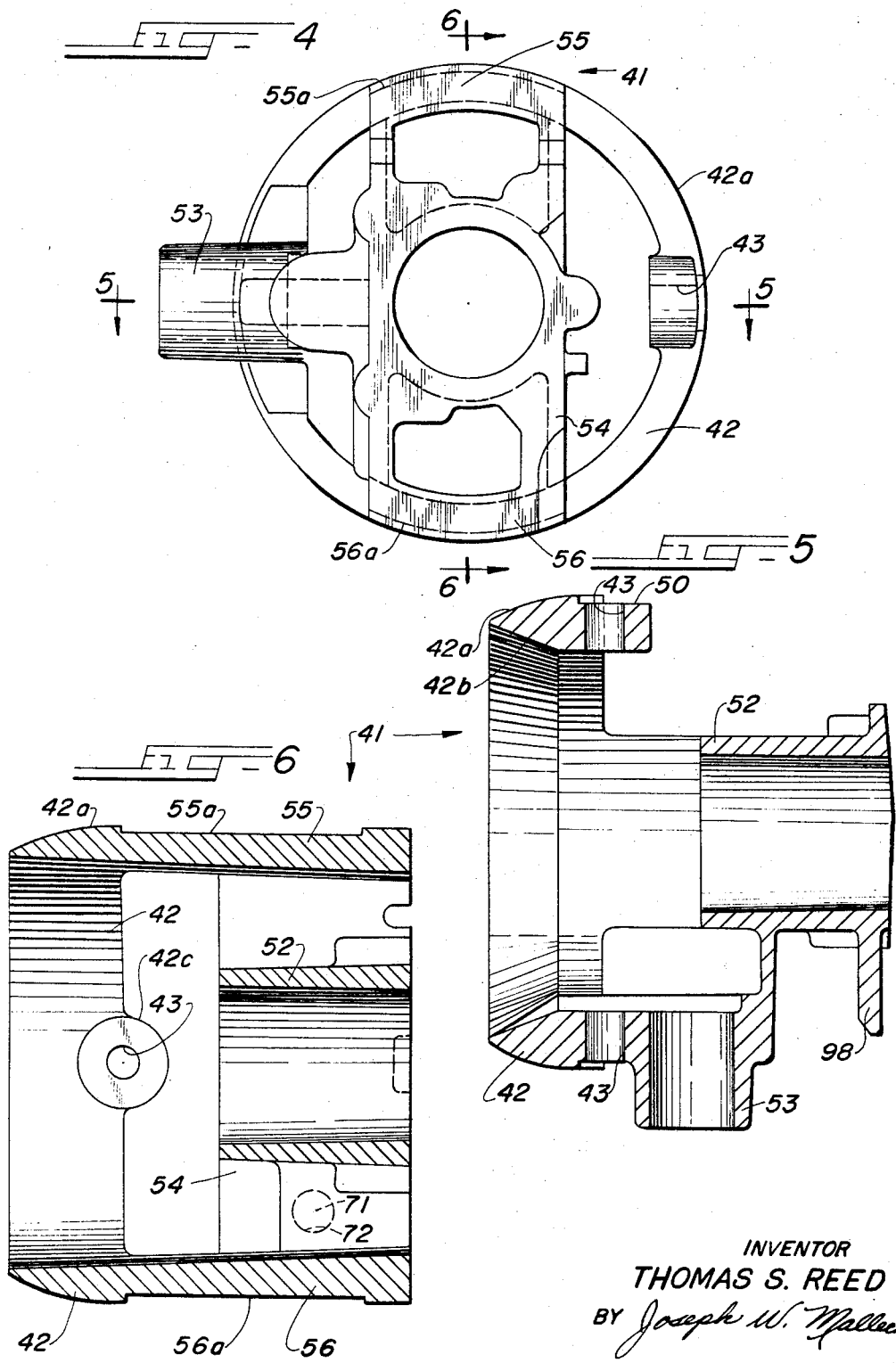
INVENTOR
THOMAS S. REED
BY Joseph W. Malleck
ATTY.

United States Patent Office 3,385,128
Patented May 28, 1968

3,385,128
ADJUSTABLE STEERING MECHANISM
Thomas S. Reed, Glen Ellyn, Ill., assignor to Borg-Warner Corporation, Chicago, Ill., a corporation of Illinois
Filed Nov. 26, 1965, Ser. No. 509,771
7 Claims. (Cl. 74—493)

ABSTRACT OF THE DISCLOSURE

A tiltable steering column includes an outer housing with a J-shaped bracket having a tiltable head pivotally supported on the J-shaped bracket with interengaging teeth between the tiltable head and one leg portion of the J-shaped bracket.

---

This invention relates to an adjustable steering mechanism and more particularly to angular adjustments for that portion of the mechanism which is compactly arranged to fit substantially within the vehicle interior compartment.

It is a primary object of the invention to provide an improved adjustable steering mechanism which employs steering linkage and supporting structure both pivotal about a common axis relatively close to the steering wheel, the mechanism having an improved locking means for holding said steering mechanism in a selected angular position while still permitting steering, said locking means being particularly characterized by its improved and easier mode of operation.

Another object of this invention is to provide an adjustable steering mechanism which has a supporting structure or jacket for an interior steering linkage both cooperating to provide a more compact and durable adjusting unit while at the same time providing an increased degree of variation in the adjustable positions without sacrificing necessary space from mounting auxiliary equipments, such as turn signals and transmission shift means.

Particular structural features pursuant to the above object comprises the provision of a supporting means for the interior steering linkage which has a J-shaped bracket rigidly mounted and carrying journals for pivoting an outer housing or jacket about a first axis which is generally perpendicular to the axis of rotary movement of the steering linkage; the locking means comprises a first element integrally formed as one end of the J-bracket and another element comprising a pivotally mounted pawl, each element of which have series of toothed projections for interengagement, the toothed projections lying on arcs having centers which are common with the first axis of said J-bracket, and the provision of a unitary control member supported by the outer casing and which is movable within a vertical plane for actuating a pantograph linkage leading to the pivotal pawl. A flexible torsion means may be employed about the linkage for normally biasing said pawl into interengagement with the end of the J-bracket and another resilient means may be employed to normally bias the housing to an extreme angular position about the first axis when the locking means is disengaged.

Other objects and advantages of this invention will become more apparent from the following detailed description taken in connection with the accompanying drawings in which:

FIGURE 1 is a central sectional view of an adjustable steering mechanism embodying the principles of this invention and having certain portions thereof broken away;

FIGURE 1a is a fragmentary illustration of the steering mechanism relative to a vehicle installation;

FIGURE 2 is a sectional view taken substantially along line 2—2 of FIGURE 1;

FIGURE 3 is an end view of the structure shown in FIGURE 1;

FIGURE 4 is an end view of the upper steering assembly casting;

FIGURE 5 is a sectional view taken substantially along line 5—5 of FIGURE 4; and FIGURE 6 is a sectional view taken substantially along line 6—6 of FIGURE 4.

Turning now to the drawings and particularly to FIGURE 1, there is illustrated a preferred embodiment of adjustable steering mechanism, broadly designated 10 which comprises a steering linkage A flexibly jointed about an axis B, the axis being located substantially close to the dash board of the vehicle having an interior compartment 11, as shown in FIGURE 1a. The steering linkage is movable through a vertical plane 12 about the axis B and undergoes an angular adjustment which may be approximately 13° in either direction of a neutral or aligned position (see FIGURE 1a). The linkage is effective for a rotary steering movement about an axis C for each of the shafts A-1 and A-2 comprising the steering linkage and is coincident when each of the shafts are in a aligned position. A supporting means D surrounds the steering linkage and is flexibly jointed also about the axis B. A locking means E is nested within and carried by the supporting means D and has interengageable elements E-1 and E-2 normally biased together and which may be selectively disengaged by operation of a unitary control member F operable in a convenient plane 13 generally contains the axis C and the member F for movement in a somewhat horizontal plane.

Turning now in more particularity to the components of said mechanism, the lower tube of shaft A-1 is operably connected to the upper steering tube or shaft A-2 by a universal joint assembly 14. The lower tube A-1 may extend through the floor board of a typical automobile for connection to steering rods by suitable linkage (not shown). The upper steering tube has one end 15 provided with threading for coupling to a typical steering wheel 16 as generally outlined in FIGURE 1a. The other end 17 of A-2 and end 18 of tube A-1 carry yokes 19 and 20 respectively with ears 19a and 20a of each of the yokes having arcuate grooves 21 for reception of ball bearings 22 at opposite sides thereof which also are received in seats 23 within a center connecting member 24. The grooves 21 of each respective yokes are effective to operate in planes perpendicular to each other so as to provide for universal action. This type of joint is well suited for this type of adjustable steering mechanism in that it has substantially no loose play which is critical within a steering environment.

The supporting means D comprises a lower assembly 25 having an inner shift tube 26 concentrically disposed about the lower steering shaft A-1, the shift tube 26 carries an outer telescoping casing 27 comprised of sleeve sections 28 and 29 spaced apart by bushings 30 and provided with garter springs 31 for providing a rollable or slip connection therebetween; a slip lock 32 may be provided for holding the sections 28 and 29 in specific longitudinal position. Mounted upon the upper end of the shift tube 26 is a gear shift lever housing 33 comprised of a casting having an inner sleeve 33a supported upon the necked portion 26a of the shift tube and outer shoulder 33b which may be fixedly attached to a suitable portion of the vehicle, a radial portion 33c extends between the inner sleeve and shoulder. Although this invention herein is solely concerned with the tiltable or angular movement of the steering mechanism the embodiment in FIGURE 1 shows structure which would normally cooperate with an additional telescoping or slip connection for the entire steering column which is more particularly shown and described in copending U.S. application Ser. No.

512,293, filed Dec. 8, 1965. Telescoping shields 35 are mounted upon the shoulder 33b of the shift lever housing to enclose the separation between the upper portion of the sections 28 and 29 and the shift lever housing. Although not shown, a shift lever may extend through an opening 36 and connect with a bracket 37 which is adapted for slight arcuate movement urging the shift tube therewith; a J-bracket 38 is carried by the shift lever housing 33 for providing a rigid mounting. The connection between the J-bracket 38 and the shift lever housing is by way of fasteners 39 which extend through the base 38a of the J-shape (as shown in FIGURE 1) through arcuate openings 40 in the shift bracket 37 into the shift lever housing.

The supporting means has an upper assembly 40 comprising an outer housing or casting 41 (shown independently in FIGURES 4–6); the casting 41 has one end provided with a ring 42 defined with a gent'y curved outer surface 42a and an inner surface 42b having in part a conical shape. The ring 42 is provided with diametrically opposite bosses 42c within which is defined aligned openings or bores 43 having an axis common with the axis B about which the steering linkage is flexed. The casting is further provided with a neck 53 integrally formed to the forward edge of the ring 42 and a central forwardly disposed sleeve 52 is carried centrally inward of the exterior dimension of the casting supported by webs 54 extending transversely between upper and lower panels 55 and 56 respectively. The sleeve has an interior cylindrical surface 52a for journalling a portion of the steering linkage as will be described. Both the upper and lower panels extend longitudinally from the ring 42 and each have, respectively, recesses 55a and 56a defined in the outer surfaces thereof. A flange 98 is formed to a forward portion of the sleeve 52 and radiates outwardly therefrom; at least one opening 72 is defined in an off-set portion of webs 54 cooperating with the locking means as will be described.

The outer housing or casting 41 is pivotally carried upon the rigid J-bracket 38 by way of journalling assembly having stepped pins 44 received in each of the openings 43 of ring 42. Each pin has a major cylindrical surface or diameter 44a which fits within the opening 43 and a smaller cylindrical surface or diameter 44b which is effective to carry a sleeve 45 thereon. The major and minor diameters or cylindrical surfaces 44a and 44b are separated by a conical annular shoulder 44c. Each of the sleeves are also stepped having a smaller cylindrical surface fitting within one of the diametrically spaced openings 59 defined in the opposite legs of the J-bracket 38. Each of the sleeves 45 have an annular shoulder 45a adapted to abut the side of the J-bracket and separate a major cylindrical surface or diameter 45c of the sleeve from the smaller diameter. Each sleeve has an interior cylindrical surface 45b adapted to fit about the stepped pin minor diameter 44b; each sleeve extends through the J-bracket legs and carries a retainer 46 on the interior end thereof. Each of the retainers having suitable grooving 48 for reception of a diaphragm or spring washer 47 effective to maintain the inner retainer and sleeve assembled within the J-bracket openings.

The outer housing 41, pivotally carried by the J-bracket, is effective to journal the forward shaft of the steering linkage A–2 by way of a split bearing assembly 76 received within the sleeve 52 of the casting. The bearing assembly 76 comprises a forward bearing unit 78 and a rear bearing unit 77, each having an inner and outer races (77a and 77b; 78a and 78b respectively). The bearing units are biased longitudinally apart by way of a coiled spring 79 and are limited in longitudinal movement by an annular shoulder 80 defined upon a portion of the yoke 19 of the universal joint assembly and another annular stop 81 formed as a plate, the plate 81 being held in position by fasteners 82 extending into the casting 41.

Turning now to the locking means E, which provides one of the novel aspects of this construction, it comprises interengageable elements E–1 and E–2; element E–1 is formed as an integral part of the J-bracket 38 with a series of projections 60 formed along an arcuate path 62 (see FIGURE 2) on the end edge of leg 38b of the J-bracket. The arc 72 has a radius with a center located at 63 which is coincident with the axis B for flexing the steering linkage. Complementary projections 61 are formed on a pawl 65 having a thickness or transverse extent substantially the same as the transverse extent of the J-bracket leg 38b. Projections 61 are arranged along an edge 65a of the pawl which is arcuately shaped complementary to the arcuate end of the J-bracket. The pawl 65 is mounted at one end 65b on an off-set shaft 68 extending through an opening 66 in the pawl and keyed for pivotal total movement therewith. The shaft 68 is journalled with opposite ends received in openings 72 of the casing. To maintain the edge or side 65a of the pawl in interengagement with the projections of teeth on the J-bracket, a biasing means or torsion spring 74 is employed which is wrapped around a spacer 73 mounted on shaft 68 with one end of the coiled spring 74a in engagement with outer side or edge 65c of the pawl; the other end 74b of the spring is received within an opening 75 of the central casting sleeve 52 for being held against movement. The opposite end of the shaft 68 carries an off-set arm 69 keyed for movement with the shaft defined at its end 69a; surface 70 of the off-set arm is disposed in a plane effective to be engaged by the control member F.

The off-set arm 69, pawl 65, and shaft 68 together comprise a linkage which, when pivoted at one end, will cause pivotal movement of the other end thereby permitting disengagement or locking movement of element E–2 without taking up excessive space and thereby fitting within the space requirements of a compact tiltable steering head.

In order to permit control of the locking means, the unitary control member F comprises a single lever 85 extending through the neck 53 of the housing 41 and is journalled for universal movement therein by a mounting assembly 86 including a ball 86a carried by the lever and received or journalled within a mating insert 86b carried by the neck 53. The lever 85 is effective to articulate about its mounting 86 and is particularly effective to move within a generally horizontal plane or a plane which includes the axis C and the longitudinally extent of the lever so that the side or surface 70 of the off-set arm may be moved pivotally about shaft 68.

As delineated more particularly in co-pending U.S. application Ser. No. 509,907, filed Nov. 26, 1965, the control member may also be used to control or slip lock to regulate telescoping movement of the steering column. This end, a link 87 is attached to the lever end 85a effective to pivot a crank 88a carried by a rod 88 leading to the slip lock 32, the rod being supported in part by a saddle 89. To operate the slip lock, the lever must be moved in a plane different than that for operation of the tilt head.

The definition of the above locking means particularly permits the incorporation of auxiliary equipment 95 which may comprise a turn signal having a switching element 96 attached to a journal 97 which is carried by a flange 98 of the housing at the end and a web 99 at the opposite end thereof. The auxiliary equipment fits in a position adjacent the central sleeve 52 of the housing and rearward of the front of the casting while affording no interference with the locking means.

In order to enable the tiltable head or upper portion of the steering column to be adjusted with little effort, an angular bias means is employed comprising at least one coiled tension spring 90 having one end 90a attached to a bracket 91 which in turn is carried by the J-bracket base 38a; the spring has opposite reduced ends 93a carried in the separated webs 54 of the casting or housing 41. An access slot 94 is defined in the upper edge of the plate 81 for permitting mounting of the spring 90.

The relative disposition of the various axes of the movable elements contribute to a novel adjustable steering head; the locking means is provided with an axis 71 for pivotal movement which lies in a plane generally perpendicular to a plane passing through the steering axis C, the axis 71 being off-set from axis C (as best shown in FIGURE 2); the unitary control member is adapted for movement in a generally horizontal plane which may pass through the central axis C of the steering linkage with the longitudinal extent of the lever closely adjacent but slightly off-set from the axis B.

In operation, the driver, upon deciding to leave from the vehicle, normally wishes to adjust the steering head so that it will be raised or tilted in an extreme upward position to allow freer exit and entrance through the front seat of the vehicle. To do so, the operator moves lever 85 in a direction to cause the inner end 85a to urge the off-set arm 69 (and thereby the entire assembly including pawl 65) in a clockwise direction as viewed in FIGURE 2. In so doing, the torsion spring 73 will be overcome permitting separation of elements E-2 and E-1. The casting 41 is thereby free to be moved about axis B. Normally, the driver may wish to raise the steering head to the most extreme position; biasing means (including spring 90) will normally urge the head to such extreme position without guidance of the operator. Upon reaching the extreme position the driver merely releases the control member F permitting the torsion spring to re-engage elements E-1 and E-2 resulting in locking the assembly in that particular angular disposition. The cycle may be repeated as often as necessary to adjust the steering column head to any other intermediate or opposite extreme angular position.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit.

I claim:

1. An adjustable steering mechanism, comprising: linkage for providing a rotary steering movement about a first axis and being flexibly jointed for bending movement about a second axis; means supporting said linkage for steering movement and being flexibly jointed about said second axis, said supporting means comprising an outer housing and a J-shaped bracket nested within said outer housing and fixed against movement, said bracket having journals mounted thereon for pivotally supporting said outer housing about said second axis and for movement within a vertical plane, one end of said bracket having a series of toothed projections defined integrally thereon spaced from said second axis; and means for selectively and releasibly locking said linkage and supporting means in one of a plurality of angular positions about said second axis, said locking means comprising a pawl having a series of toothed projections effective to mate with the projections of said J-bracket, said pawl being pivotally supported about a third axis and movable within a vertical plane spaced from the vertical plane of movement of said linkage, resilient means normally biasing said pawl and toothed end of said J-bracket together, a control member movable in a vertical plane perpendicular to the plane of movement of said linkage for actuating said pawl and overcome said resilient biasing means for disengaging said locking means whereby said outer housing and at least one portion of said linkage may be moved together about said second axis.

2. An adjustable steering mechanism as in claim 1, in which said outer housing is normally biased to an extreme angular position when said locking means is in the disengaged condition.

3. An adjustable steering mechanism comprising: linkage for providing rotary steering movement about a first axis and being jointed for bending movement about a second axis; means supporting said linkage for steering movement and being flexibly jointed about said second axis; said means supporting said linkage comprising an outer housing, a J-shaped bracket having legs forming terminal portions thereof nested within said outer housing and fixed against movement, said J-shaped bracket having journals mounted in said leg portions for defining said second axis and for providing a pivotal support for said outer housing, and means for selectively and releasably locking said linkage and supporting means in one of a plurality of angular positions about said second axis while providing for steering movement, said locking means comprising interengageable elements each having complementary toothed projections arranged about an arc defined by a radius having a center lying on said second axis, one of said interengageable elements defined by a portion of said J-shaped bracket, at least one of said elements being movable into and out of engagement with the other of said elements, and a control member for actuating said one element for providing locking engagement, and means normally biasing said interengageable elements together.

4. An adjustable steering mechanism as in claim 3, in which said control member is operably supported by said outer housing for movement in a direction from the other of said elements.

5. An adjustable steering mechanism as in claim 4, in which said one interengageable element of said locking means comprises a toothed pawl carried by a linkage mechanism pivotal about a third axis, torsion means mounted about said third axis for normally urging said pawl into interengagement with the other of said elements, and said linkage mechanism remote from said pawl for selectively urging interengagement of said elements.

6. An adjustable steering mechanism as in claim 3, in which said steering linkage has one portion disposed to one side of said second axis, said steering linkage portion being journalled for rotary steering movement by a bearing assembly by said outer housing.

7. The adjustable steering mechanism as in claim 6, in which said bearing assembly comprises: spaced stops along the first axis of said steering linkage portion, and spaced bearing units resiliently biased apart to engage said spaced stops.

References Cited

UNITED STATES PATENTS 3,267,766 8/1966 Glover et al. _____ 74—493
3,302,478 2/1967 Pauwels _____ 74—493

MILTON KAUFMAN, *Primary Examiner.*